(12) United States Patent
Abreu et al.

(10) Patent No.: US 8,958,757 B2
(45) Date of Patent: Feb. 17, 2015

(54) SYSTEM, METHOD AND APPARATUS FOR MOBILE TRANSMIT DIVERSITY USING SYMMETRIC PHASE DIFFERENCE

(75) Inventors: Eduardo Abreu, Allentown, PA (US); Haim Harel, New York, NY (US)

(73) Assignee: Google Inc., Mountain View, CA (US)

( * ) Notice: Subject to any disclaimer, the term of this patent is extended or adjusted under 35 U.S.C. 154(b) by 773 days.

(21) Appl. No.: 13/104,749

(22) Filed: May 10, 2011

(65) Prior Publication Data

US 2011/0281610 A1    Nov. 17, 2011

Related U.S. Application Data

(60) Provisional application No. 61/333,021, filed on May 10, 2010.

(51) Int. Cl.
*H04B 7/06* (2006.01)
*H04B 7/04* (2006.01)

(52) U.S. Cl.
CPC ............ *H04B 7/0682* (2013.01); *H04B 7/0404* (2013.01)
USPC ........... 455/69; 455/101; 455/276.1; 455/522

(58) Field of Classification Search
None
See application file for complete search history.

(56) References Cited

U.S. PATENT DOCUMENTS

| | | | |
|---|---|---|---|
| 5,642,353 A | 6/1997 | Roy, III et al. | |
| 5,832,044 A | 11/1998 | Sousa et al. | |
| 5,991,330 A | 11/1999 | Dahlman et al. | |
| 5,999,826 A | 12/1999 | Whinnett | |
| 6,185,440 B1 | 2/2001 | Barratt et al. | |
| 6,226,509 B1 | 5/2001 | Mole et al. | |
| 6,236,363 B1 | 5/2001 | Robbins et al. | |
| 6,330,294 B1 | 12/2001 | Ansbro et al. | |
| 6,343,218 B1 | 1/2002 | Kaneda et al. | |
| 6,392,988 B1 | 5/2002 | Allpress et al. | |
| 6,492,942 B1 | 12/2002 | Kezys | |
| 6,636,495 B1 | 10/2003 | Tangemann | |
| 6,704,370 B1 | 3/2004 | Chheda et al. | |
| 6,745,009 B2 | 6/2004 | Raghothaman | |

(Continued)

FOREIGN PATENT DOCUMENTS

| | | |
|---|---|---|
| EP | 0 986 193 | 3/2000 |
| EP | 1262031 | 12/2002 |

(Continued)

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

(Continued)

*Primary Examiner* — Philip Sobutka
(74) *Attorney, Agent, or Firm* — Gottlieb, Rackman & Reisman, PC

(57) ABSTRACT

A mobile communication device and a method of controlling same, in which the mobile communication device transmits a plurality of transmit diversity signals comprising a first transmit signal and a second transmit signal differing at least by values of a transmit diversity parameter, receives a plurality of feedback signals from at least one base station in response to the plurality of transmit diversity signals; and determines a system delay based on detecting that a number of expected feedback signal patterns among the received plurality of feedback signals exceeds a system delay threshold.

26 Claims, 6 Drawing Sheets

(56) References Cited

U.S. PATENT DOCUMENTS

| | | |
|---|---|---|
| 6,810,264 B1 | 10/2004 | Park et al. |
| 6,859,643 B1 | 2/2005 | Ma et al. |
| 6,882,228 B2 | 4/2005 | Rofougaran |
| 2003/0112880 A1 | 6/2003 | Walton et al. |
| 2004/0048584 A1 | 3/2004 | Vaidyanathan et al. |
| 2004/0085239 A1 | 5/2004 | Ukena et al. |
| 2005/0059355 A1 | 3/2005 | Liu |
| 2005/0143113 A1 | 6/2005 | Lee et al. |
| 2008/0039030 A1* | 2/2008 | Khan et al. .................... 455/101 |

FOREIGN PATENT DOCUMENTS

| | | |
|---|---|---|
| EP | 1 282 242 | 2/2003 |
| EP | 1 282 244 | 2/2003 |
| EP | 1 284 545 | 2/2003 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 03/090386 | 10/2003 |
| WO | WO 2004/045108 | 5/2004 |
| WO | WO 2005/081444 | 9/2005 |

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

* cited by examiner

Signal Modifier
(Beamformer)

SYSTEM, METHOD AND APPARATUS FOR MOBILE TRANSMIT DIVERSITY USING SYMMETRIC PHASE DIFFERENCE

CROSS-REFERENCE TO RELATED APPLICATIONS

This application claims benefit of provisional patent application Ser. No. 61/333,021, filed May 10, 2010, which is incorporated in its entirety by reference herein.

FIELD OF THE INVENTION

The invention relates generally to mobile communications devices and methods and more particularly to a system and method for determining a delay between a mobile communication device and a base station providing feedback.

BACKGROUND OF THE INVENTION

Mobile transmit diversity beamforming refers to transmitting a signal in two streams over two respective transmit antennas, which may have the same or different amplitudes, with a transmit diversity parameter, such as a phase difference, applied to the first stream with respect to the second stream by a signal modifier (beamformer), connected to the transmit antennas ports. Due to fading and multipath effects, in order to produce effective mobile transmit beamforming, i.e., increasing the likelihood of constructive rather than destructive interference at the base station, a feedback signal from the base station is desirable to adjust the phase difference.

Power-control signaling is a technique used to minimize inter-channel interference and increase network capacity. For example, mobile communication standards include a high rate, continuous, power-control signaling to ensure that mobile communication devices do not transmit too much or too little power. More specifically, based on the strength of the signal sent from the communication device and received at the base station, the base station sends a power-control signal or power control bit to the mobile communication device indicating whether the communication device should increase or decrease the total power of its transmitted signal. The transmission rates for each value of the power-control signals are, for example, 1.25 ms for cdmaOne (IS-95)/CDMA2000, and 0.66 ms for WCDMA.

In some mobile transmit diversity systems, the feedback signal may be a power control signal. For example, in 3GPP R99, HSPA, and LTE Rel. 8, as well as CDMA2000 networks, the Mobile Unit (also referred to as user equipment, or UE) may have no direct knowledge of the channel impulse response of the different uplink transmit receive antenna pairs. Accordingly, a mobile transmit beamforming diversity system may use a quality-indication signal, which need not require any new or non-standardized dynamic feedback signaling between the network and the UE in HSPA. The base station may be unaware that the UE is in open loop beamforming transmit diversity mode, e.g., no changes may need to be made to the NodeB receiver processing (synchronization, channel estimation, demodulation, decoding) in order to accommodate UEs in this mode. In other mobile transmit diversity systems, the feedback signal may be a dedicated transmit diversity feedback signal, for example, instructing the UE to maintain or reverse a phase difference change, or providing a UE with a phase difference adjustment or value.

In order to correctly use information obtained from one or more feedback signals from the base station, it is desirable for the mobile device to correlate or otherwise match between a transmit signal or transmit diversity parameter, and the feedback signal that responded to that particular transmit signal or transmit diversity parameter. That is, the system delay between a mobile diversity transmission and a feedback should be determined by the mobile device.

One way to determine a system delay is based on a standard handshake already provided for, between the UE and the network upon initialization and upon other changes, e.g., base station handover. When identifying the type of network that serves it, the UE will also conclude from that info what is the correct delay. However, such identification is inadequate, as it may not always be done, or may not be done well, or may involuntarily be changed without notice.

SUMMARY OF EMBODIMENTS OF THE INVENTION

A mobile communication device and a method of controlling same, in which the mobile communication device transmits a plurality of transmit diversity signals comprising a first transmit signal and a second transmit signal differing at least by values of a transmit diversity parameter, receives a plurality of feedback signals from at least one base station in response to the plurality of transmit diversity signals; and determines a system delay based on detecting that a number of expected feedback signal patterns among the received plurality of feedback signals exceeds a system delay threshold.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Figure 1:
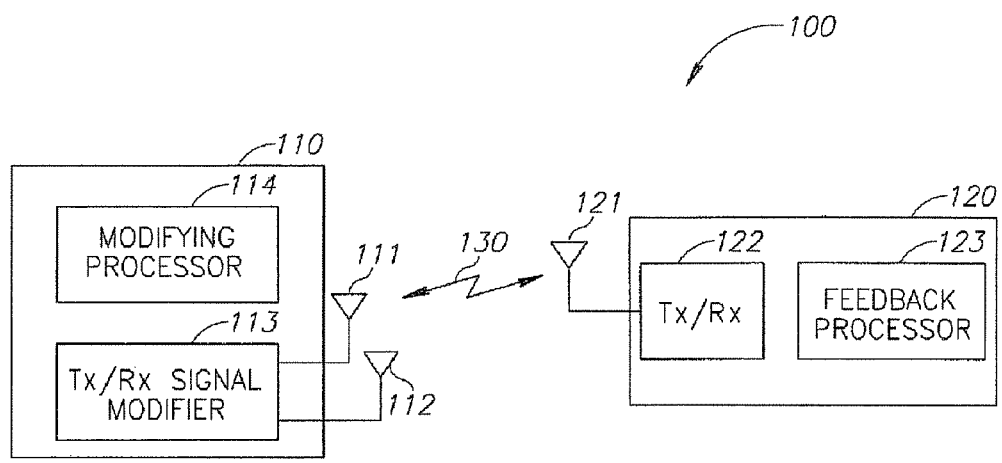
FIG. 1 shows a system block diagram of a mobile transmit diversity communication network.

Reference is made to FIG. 1, which illustrates a mobile transmit diversity system 100 according to an embodiment of the invention, in which mobile transmit diversity communication device 110 may use a modifying processor to modify a data signal for transmission to obtain a transmit diversity parameter. Transmit/receive signal modifier 113 may be a module to receive the signal for transmission and the transmit diversity parameter and obtain a plurality of signals differing in respect of the transmit diversity parameter. The plurality of signals may be transmitted using antennas 111 and 112. It will be recognized that mobile transmit diversity communication device 110 may transmit using more than two antennas, but two are used for purposes of demonstration. A feedback device 120 may be a base station having antenna 121 to receive the signals over channel 130, measure or obtain a transmit quality indication signal 122, e.g., signal power, and process the information using feedback processor 123 to obtain a feedback parameter. The feedback parameter may be any feedback signal, e.g., a transmit power control signal or a dedicated transmit diversity parameter feedback signal, and may be transmitted to mobile communication device 110 for processing using modifying processor 114, to obtain the transmit diversity parameter. It will be recognized that feedback communication device 120 may have more than one antenna, however, one is shown for illustrative purposes.

Figure 2:
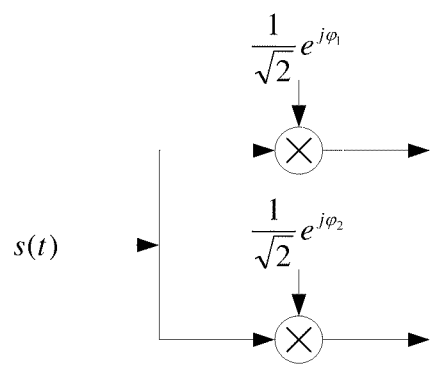
FIG. 2 shows a signal modifier of a mobile transmit diversity communication device according to an embodiment of the invention.

Reference is made to FIG. 2, which shows an example of a signal modifier of a mobile transmit diversity communication device according to an embodiment of the invention, in which the transmit diversity parameter is a phase difference, such that the transmit diversity signals differ by a phase, the signal modifier introducing a phase difference. As shown in FIG. 2, transmit beamforming refers to splitting the incoming signal into two streams with a different diversity parameter, e.g., phase shifts, $\phi_1$ and $\phi_2$ applied to the first stream and to the second stream. The phase difference, $\Delta\phi=\phi_2-\phi_1$, can be determined at least in part by one or more feedback signals, for example, power control bits, from one or more base stations. The feedback signals may be used as an input to the mobile transmit beamforming algorithm running on a Modifying Processor or hard coded in an integrated circuit.

It will be recognized that generally, the phase difference between the antenna signals may be used to produce beamforming, such that varying a phase difference may change the direction of the beam formed by constructive interference of the signals. Accordingly, feedback from the basestation, e.g., in the form of a power control bit, may be used to increase perceived power at the basestation by directing the beam to form at the base station using changes in phase rotation. One method according to embodiments of the invention for maximizing perceived power at the basestation using phase rotation is described herein.

According to some embodiments of the invention, a transmit diversity algorithm is based on interrogating the network's preferred weights by sending +/−pairs of phase perturbations and observing the corresponding responses, e.g., feedback from the base station. In the following example, the transmit power control signal (TPC) is used as an illustrative embodiment; however, it will be recognized that other suitable feedback signals may be used consistent with the principles and teachings of the present invention. In order to apply the feedback signal from the base station, e.g., the power control bit, the mobile station may be required to know or determine to which transmission the feedback relates. However, the delay of a round trip between the UE phase change and the corresponding TPC response may not be known, e.g., one time slot or two time slots or sometimes more.

This delay may make a significant difference in determining to whether one or another particular value of the diversity parameter, e.g., phase difference, resulted in the feedback. Indeed, this may be critically important, as incorrectly interpreted delays may lead to beam divergence, rather than beam convergence. Accordingly, embodiments of the present invention may identify system delay by analysis of the TPC (or corresponding power) profile. The method may be performed in individual instances, or it may operate continuously, or at regular intervals, in the background.

In some embodiments of the invention, in order to determine a value for a new phase difference, the phase rotation may be varied by successive adjustments, e.g., $-/+\delta/2$, such that in one transmission the phase rotation is $\Delta-\delta/2$, and in a subsequent transmission, the phase rotation is $\Delta+\delta/2$. Thus, in one transmission, one antenna may transmit using phase $\Phi$, and the other antenna may transmit using phase $\Phi+\Delta-\delta/2$, and in a second transmission, one antenna may transmit using phase $\Phi$, and the other antenna may transmit using $\Phi+\Delta+\delta/2$. The power control signals corresponding to these two transmissions may be received, and compared. If the first transmission resulted in a POWER DOWN, and the second transmission resulted in a POWER UP, then the first transmission was received with higher perceived power, and $\Delta$ may be incremented in the direction of $-\delta/2$. If the first transmission resulted in a POWER UP, and the second transmission resulted in a POWER DOWN, then the second transmission was received with higher perceived power, and $\Delta$ may be incremented in the direction of $+\delta/2$.

Figure 3:
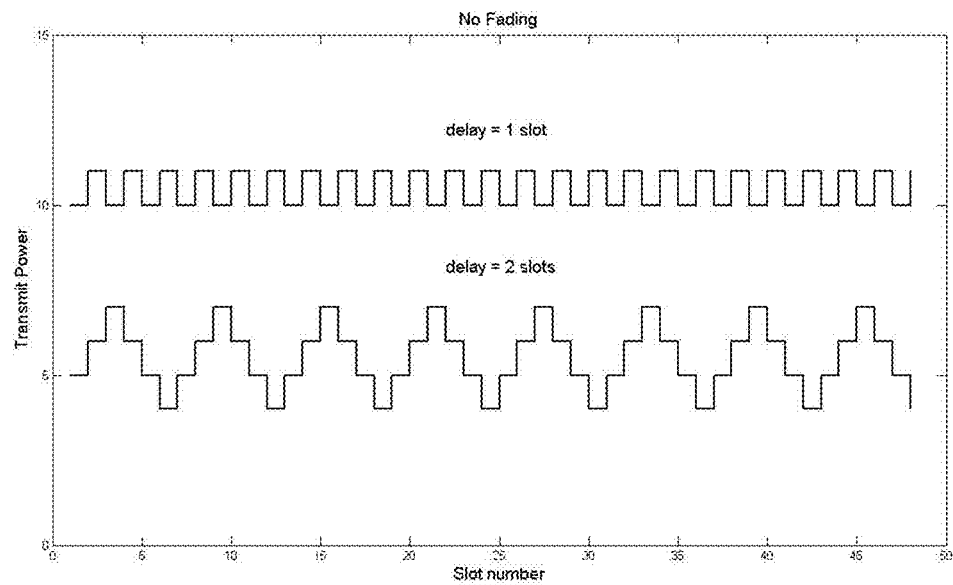
FIG. 3 shows two feedback patterns of a base station responding to a mobile communication device transmitting transmit diversity signals according to embodiments of the invention, when little or no fading is present.

FIG. 3 shows two feedback patterns of a base station responding to a mobile communication device transmitting transmit diversity signals according to embodiments of the invention, when little or no fading is present. FIG. 3A depicts a feedback stream where the system delay is only one slot, in which case the mobile station adjusts the power one slot after the feedback signal (such as a TPC command) is issued by the base station. Therefore, assuming no fading, the TPC profile in this case is typically an alternating sequence of: {+1, −1, +1, −1 . . . }. In contrast, as depicted in FIG. 3B, when the system delay is two slots, the extra delay in the mobile station response may cause the feedback signal profile to be {+1, +1, −1, −1, +1, +1, −1, −1 . . . } or {+1, +1, +1, −1, −1, −1, +1, +1, +1, −1, −1, −1 . . . }.

Figure 4:
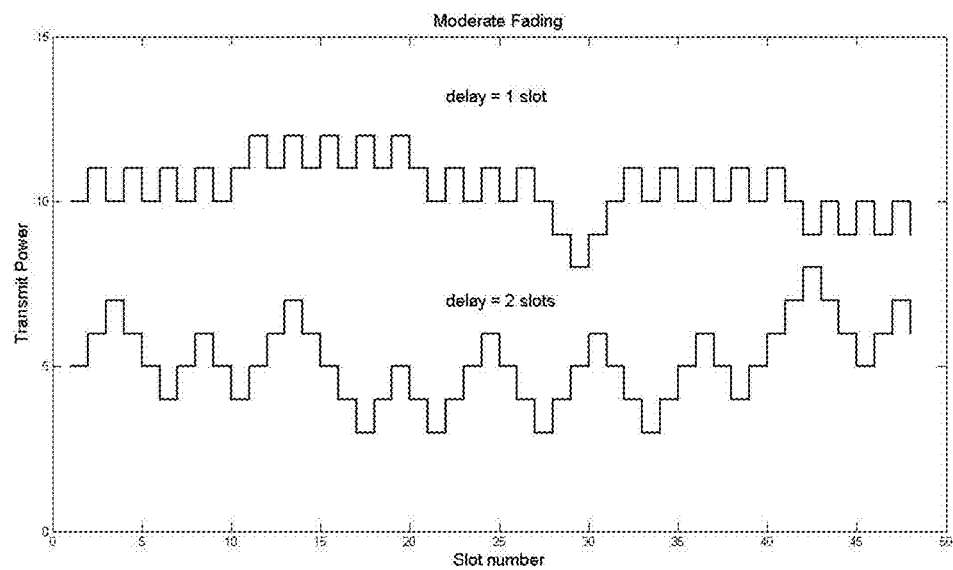
FIG. 4 shows two feedback patterns of a base station responding to a mobile communication device transmitting transmit diversity signals according to embodiments of the invention, when fading is present.

However, fading may complicate the detection. FIG. 4 shows two feedback patterns of a base station responding to a mobile communication device transmitting transmit diversity signals according to embodiments of the invention, when fading is present. FIG. 4A depicts a feedback stream where the system delay is only one slot, but there is fading. Therefore, the TPC profile in this case is generally an alternating sequence of: {+1, −1, +1, −1 . . . }, but there may be irregularities, e.g., {+1, −1, −1, +1, −1 . . . }. Likewise, as depicted in FIG. 4B, when the system delay is two slots, the extra delay in the mobile station response may cause the feedback signal profile to generally be as depicted in FIG. 3B, with some irregularities, as shown.

Figure 5:
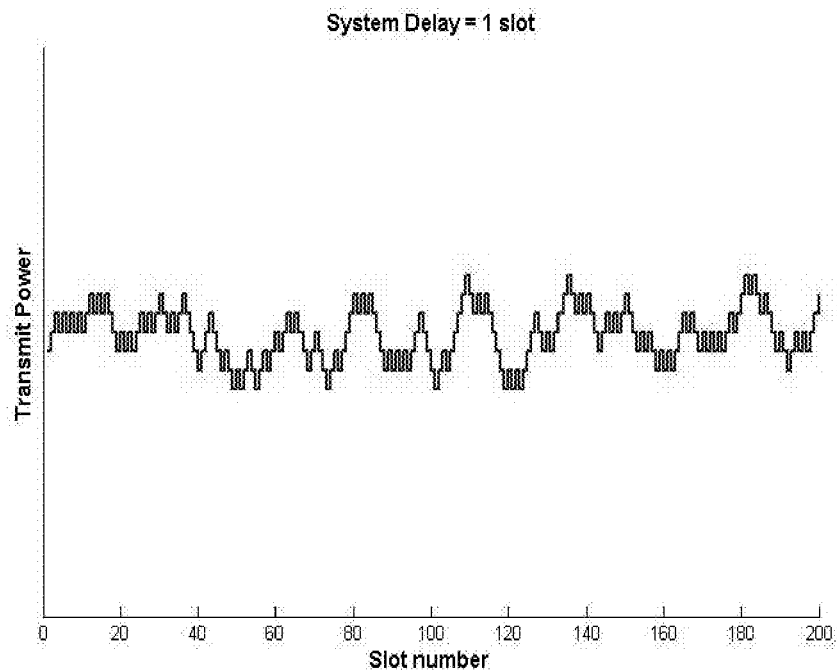
FIG. 5 depicts a stream of +1 and −1 feedback signals with fading, in which the system delay is one slot.
Figure 6:
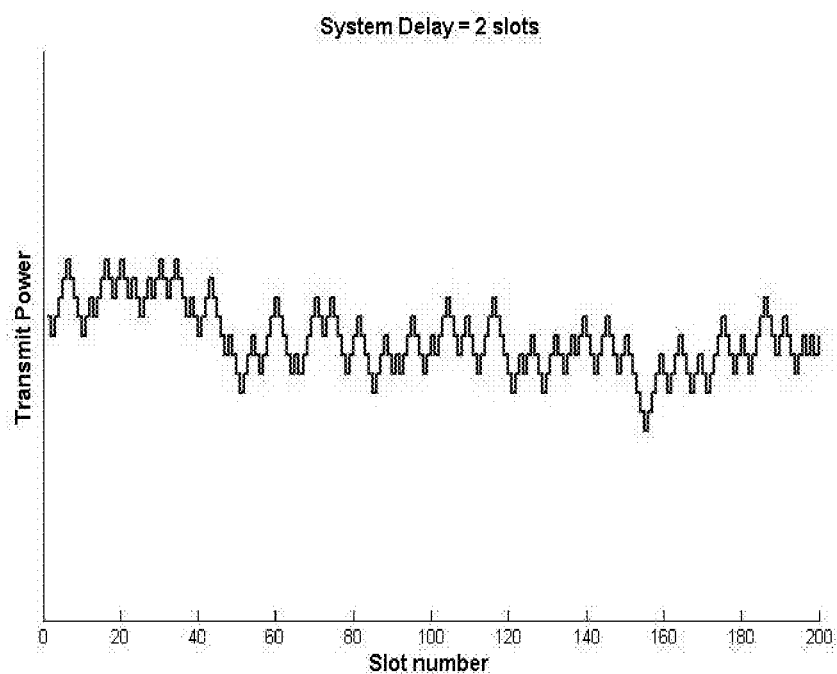
FIG. 6 depicts a stream of +1 and −1 feedback signals with fading, in which the system delay is two slots.

FIG. 5 depicts a stream of +1 and −1 feedback signals with fading, in which the system delay is one slot. FIG. 6 depicts a stream of +1 and −1 feedback signals with fading, in which the system delay is two slots.

A method and device according to embodiments of the invention may operate based on pattern recognition of different delays, applied to the feedback profiles. One or more feedback patterns may be defined, each pattern being a sliding window fixed to a number S of slots. The sliding window may advance one slot at a time, and inspect in sequence S-bit patterns in a historical sequence of feedback signals. The patterns in the historical sequence may be matched to feedback signal patterns expected to result from a one slot delay. The number N of historical slots, may be tallied.

If the percentage of occurrences of the expected pattern is greater than a threshold T, the system delay may be determined to be one slot. In some embodiments of the invention, if the number of occurrences is less than the threshold T, the system delay may be determined to be two slots. The optimal value for the threshold T may depend on the number N of slots analyzed, and may be determined experimentally. Threshold T may also vary based on cellular network systems, operating conditions, mobile equipment, etc. In some embodiments of the invention, T may range from 5 percent to 15 percent; more specifically, it may range from 10 percent to 12 percent. In some embodiments T may be 11 percent.

When the percentage of matches is not close to the threshold T, e.g., much greater or much less than T, the likelihood of correct detection is high. Moreover, the more slots analyzed, the greater the likelihood of correct detection of delay. For example, for 100 slots of data, the method is correct 92% of the time. For 250 slots of data, the method is correct 99% of the time. For 500 slots of data, the method is correct 99.7% of the time. For 1,000 slots of data, the method is correct 100% of the time. However, when the percentage of matches is close to the threshold T, the likelihood of incorrect detection is high. In some embodiments of the invention, the process may be run multiple times in parallel, for example, with different patterns or history span, and the final decision may be made based on the more conclusive outcome.

Figure 7:
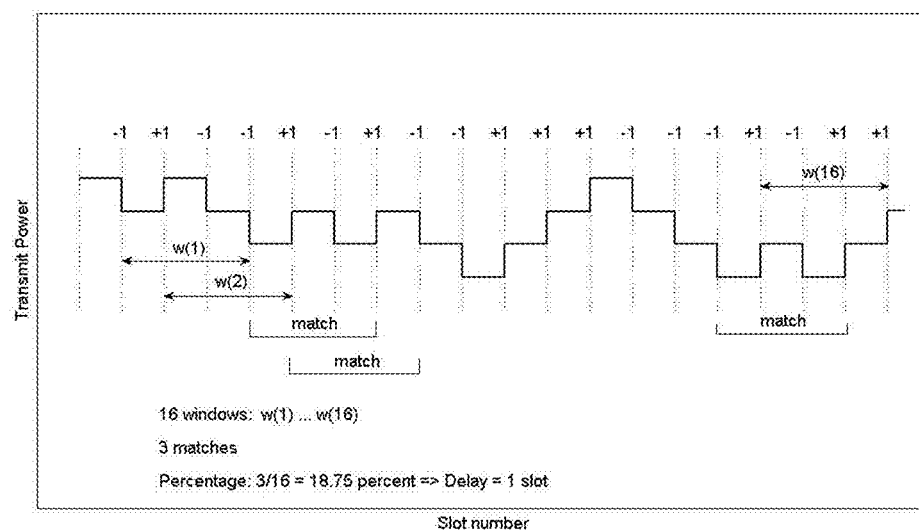
FIG. 7 depicts an illustration of a method according to an embodiment of the present invention using a delay detection algorithm.

FIG. 7 depicts an illustration of a method according to an embodiment of the present invention using a delay detection algorithm. In the illustration, the window is four bits (S=4), which may advance one slot at a time, and inspect in sequence four-bit patterns in a historical sequence of feedback signals. The historical sequence in the illustration is N=16, but it will be understood that N may typically be higher. Thus, for example, the number of times that the expected feedback sequences {+1, −1, +1, −1} or {−1, +1, −1, +1} occur during the previous N=16 time slots may be tallied. In the illustration, the number of matches is 3, out of 16 slots. Therefore, if the threshold is T=11%, then the number of matches exceeds the threshold, and the system delay may be determined to be one slot.

In some embodiments of the invention, the process may be run multiple times in parallel, for example, using the same historical data, but with different expected patterns. Thence, a final determination may be made based on the plurality of outcomes, for example, by applying a threshold to a weighted sum of the match counts.

Generally, each expected feedback sequence pattern may be identified as $P_j = \{p_1\ p_2 \ldots p_k \ldots p_{Sj}\}$, where $p_k \in \{1, -1\}$, $j=1, 2 \ldots R$, where $S_j$ is the size of expected pattern $P_j$, and R is the number of expected feedback sequence patterns. In the example below, $S_j = \{4, 5\}$, R=10.

A feedback sequence of $S_j$ slots may be defined as $TA_{i,j} = \{T_i\ T_{i-1} \ldots T_{i-k+1} \ldots T_{i-Sj+1}\}$, where i is a slot index, and $T_i$ is the feedback signal received at slot i. A match may be between an expected feedback sequence pattern $P_j$ and a feedback sequence $TA_{i,j}$ may be defined as the following case function:

$$\text{Match}(P_j, TA_{i,j}) = \begin{cases} 1, & \text{if } p_k = T_{i-k+1} \text{ for all } k \in (1, 2, \ldots, S_j) \\ 0, & \text{otherwise} \end{cases}.$$

That is, if for each of the $S_j$ slots, the feedback element is the same as the expected feedback sequence pattern element, then the Match function returns a 1; otherwise, the result is 0.

The number of matches for each expected feedback sequence pattern in the feedback history span may be tallied. The match count for pattern $P_j$ at slot (i) for a N-slot feedback window is:

$$B_{ij} = \sum_{k=1}^{N} \text{Match}(P_j, TA_{i-k+1,j}).$$

Next, the match value $C_i$ of all R patterns at slot (i) can be defined as a function of all match counts $B_{ij}$, i.e., $C_i = f(B_{i1}, B_{i2}, \ldots, B_{iR})$. In one embodiment of the invention, the match value $C_i$ of all R patterns at slot (i) may be the sum of all match counts $B_{ij}$, i.e., $C_i = B_{i1} + B_{i2} + \ldots + B_{iR}$. In another embodiment of the invention, $C_i$ may be the weighted sum of match counts of the patterns as follows. Each pattern $P_j$ may be accorded a weight $W_j$ based upon its correlation with one-slot or two-slot feedback behavior. Therefore, the match value $C_i$ may be calculated as:

$$C_i = \sum_{j=1}^{R} W_j * \sum_{k=1}^{N} \text{Match}(P_j, TA_{i-k+1,j}).$$

It will be noted that for a single expected feedback sequence pattern $P_1$, $C_i$ reduces to $$\sum_{k=1}^{N} \text{Match}(P_j, TA_{i-k+1,j}),$$

the sum of pattern matching results within the feedback window span. For multiple patterns, $C_i$ may be the weighted sum of multiple pattern matching results of feedback window i.

Next, by comparing $C_i$ to a threshold TH the system delay $D_i$ may be obtained as a case function:

$$D_i = \begin{cases} 1, & \text{if } C_i > TH \text{ (delay = 2 slots)} \\ -1, & \text{otherwise (delay = 1 slot)} \end{cases}.$$

In some embodiments of the invention, many non-overlapping $D_i$ results may be considered over a long history of feedback responses:

$$E_i = \sum_{k=MIN}^{i} D_{kN},$$

where MIN may be adjusted to include feedback history starting L seconds before the latest hard handover. For example, L=10. Accordingly:

$$\text{Detected Delay}(i) = \begin{cases} 2 \text{ slots}, & \text{if } E_i \geq 0 \\ 1 \text{ slot}, & \text{otherwise} \end{cases}.$$

Figure 8A:
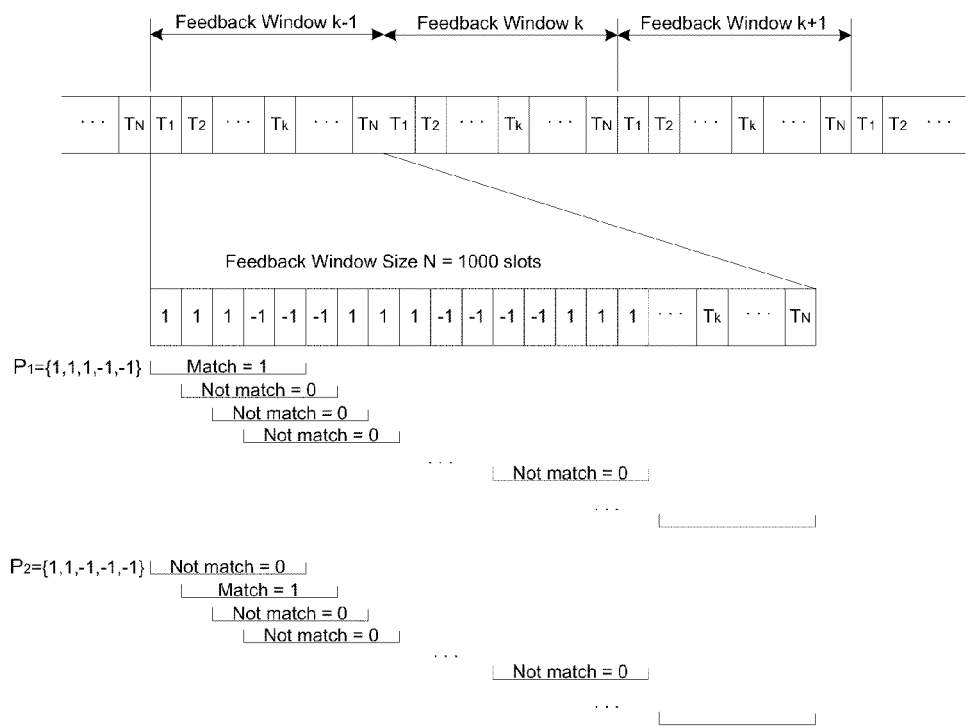
FIGS. 8A and 8B depict an illustration of a method according to an embodiment of the present invention using a plurality of delay detection algorithms.
Figure 8B:
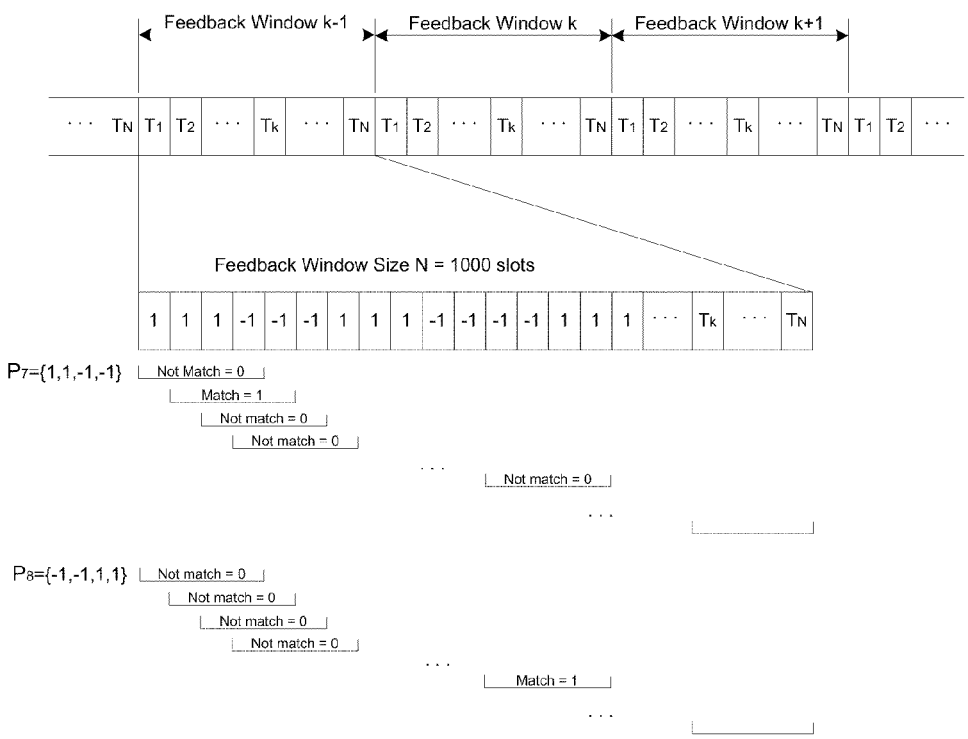

FIGS. 8A and 8B depict an illustration of a method according to an embodiment of the present invention using a plurality of delay detection algorithm. The algorithm shown tallies R=10 expected feedback sequence patterns (four 5-slot patterns, and six 4-slot patterns).

FIG. 8A shows feedback history spans k−1, k, and k+1, in which each feedback history span includes feedback signals from N=1000 slots. As shown, each overlapping window having feedback from S=5 successive slots is matched against each of four expected feedback sequences $P_j$, j=1, 2, 3, 4: $P_1=\{1,1,1,-1,-1\}$, $P_2=\{1,1,-1,-1,-1\}$, $P_3=\{-1,-1,-1,1\}$, and $P_4=\{-1,-1,1,1,1\}$. FIG. 8A depicts initial matches for $P_1=\{1,1,1,-1,-1\}$ and $P_2=\{1,1,-1,-1,-1\}$. As shown in the four initial windows of feedback history span k−1, the first 5-slot sequence matches $P_1$, while the second 5-slot sequence matches $P_2$.

FIG. 8B shows the same feedback history spans k−1, k, and k+1, in which each feedback history span includes feedback signals from N=1000 slots. As shown, each overlapping window having feedback from S=4 successive slots is matched against each of six expected feedback sequences $P_j$, j=5, 6, 7, 8, 9, 10: $P_5=\{1,-1,1,-1\}$, $P_6=\{-1,1,-1,1\}$, $P_7=\{1,1,-1,-1\}$, $P_8=\{-1,-1,1,1\}$, $P_9=\{1,1,1,1\}$, and $P_{10}=\{-1,-1,-1,-1\}$. FIG. 8B depicts initial matches for $P_7$ and $P_8$. As shown in the four initial windows of feedback history span k−1, the second 4-slot sequence matches $P_7$, while none of the initial 4-slot sequences match $P_8$.

When the number of matches for each pattern have been tallied, they may be combined in a weighted sum. For example, the weights may be $W_j=4$, for j=1, 2, 3, 4; $W_j=-20$, for j=5, 6; $W_j=2$, for j=7, 8; and $W_j=1$, for j=9, 10. It will be recognized that expected patterns $P_5$ and $P_6$ are strongly correlated with a one-slot delay, and therefore, have large absolute value. Moreover, because in the scheme of this embodiment, one-slot is designated as a lower number, the weight for these expected patterns is assigned a negative weight. When the tallies are combined in a weighted sum, the result may be compared to a threshold. For example, for N=1000, the threshold may be TH=−750.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method for controlling a mobile communication device comprising:
   transmitting a plurality of transmit diversity signals comprising a first transmit signal and a second transmit signal differing at least by values of a transmit diversity parameter;
   receiving at the mobile communication device a plurality of feedback signals from at least one base station in response to said plurality of transmit diversity signals; and
   determining a system delay based on a comparison of a number of expected feedback signal patterns among the plurality of received feedback signals and a system delay threshold
   wherein the transmit diversity parameter is a phase difference between the first transmit signal and the second transmit signal.

2. The method of claim 1, wherein the plurality of transmit diversity signals comprise a plurality of transmit diversity signals in which the phase difference alternates between a first phase difference less than a nominal value and a second phase difference greater than a nominal value.

3. The method of claim 1, wherein the feedback signals are binary signals.

4. The method of claim 3, wherein the feedback signals are transmit power control (TPC) signals.

5. The method of claim 3, wherein the expected feedback signal pattern is at least one alternating sequence of a window length of feedback signals.

6. The method of claim 5, wherein the window length is 4 slots, and wherein the expected feedback signals comprise $\{+1,-1, +1,-1\}$ and $\{-1, +1,-1,+1\}$.

7. The method of claim 1, wherein the received plurality of feedback signals comprises at least 1000 feedback signals.

8. The method of claim 1, wherein determining the system delay comprises determining whether the number of expected feedback signal patterns among the plurality of received feedback signals exceeds the system delay threshold.

9. The method of claim 8, wherein the system delay threshold is between 5% and 15%.

10. The method of claim 8, wherein the system delay threshold is between 10% and 12%.

11. The method of claim 8, wherein the system delay threshold is approximately 11%.

12. The method of claim 1, wherein determining a system delay based on detecting that a number of expected feedback signal patterns among the received plurality of feedback signals exceeds a system delay threshold comprises:
   tallying a first sum of first expected feedback signal patterns including a first number of slots in the plurality of feedback signals;

tallying a second sum of second expected feedback signal patterns including a second number of slots in the plurality of feedback signals;

combining at least the first sum and the second sum to obtain a composite sum; and determining the system delay based on a comparison of the composite sum and the system delay threshold.

13. The method of claim 12, wherein said first expected feedback signal patterns are attributed a first weight, and wherein said second expected feedback signal patterns are attributed a second weight, and wherein the composite sum comprises a weighted sum of the first sum based on the first weight and the second sum based on the second weight.

14. A mobile communication device comprising:

a transmitter to transmit a plurality of transmit diversity signals comprising a first transmit signal and a second transmit signal differing at least by values of a transmit diversity parameter;

a receiver to receive at the mobile communication device a plurality of feedback signals from at least one base station in response to said plurality of transmit diversity signals; and a processor to determine a system delay based on a comparison of a number of expected feedback signal patterns among the plurality of received feedback signals and a system delay threshold wherein the transmit diversity parameter is a phase difference between the first transmit signal and the second transmit signal.

15. The mobile communication device of claim 14, wherein the plurality of transmit diversity signals comprise a plurality of transmit diversity signals in which the phase difference alternates between a first phase difference less than a nominal value and a second phase difference greater than a nominal value.

16. The mobile communication device of claim 14, wherein the feedback signals are binary signals.

17. The mobile communication device of claim 16, wherein the feedback signals are transmit power control (TPC) signals.

18. The mobile communication device of claim 16, wherein the expected feedback signal pattern is at least one alternating sequence of a window length of feedback signals.

19. The mobile communication device of claim 18, wherein the window length is 4 slots, and the expected feedback signals are $\{+1,-1,+1,-1\}$ and $\{-1,+1,-1,+1\}$.

20. The mobile communication device of claim 14, wherein the received plurality of feedback signals comprises at least 1000 feedback signals.

21. The mobile communication device of claim 14, wherein determining the processor is to determine system delay by determining whether the number of expected feedback signal patterns among the plurality of received feedback signals exceeds the system delay threshold.

22. The mobile communication device of claim 21, wherein the system delay threshold is between 5% and 15%.

23. The mobile communication device of claim 21, wherein the system delay threshold is between 10% and 12%.

24. The mobile communication device of claim 21, wherein the system delay threshold is approximately 11%.

25. The mobile communication device of claim 14, wherein the processor is to determine a system delay based on detecting that a number of expected feedback signal patterns among the received plurality of feedback signals exceeds a system delay threshold by:

tallying a first sum of first expected feedback signal patterns including a first number of slots in the plurality of feedback signals;

tallying a second sum of second expected feedback signal patterns including a second number of slots in the plurality of feedback signals;

combining at least the first sum and the second sum to obtain a composite sum; and determining the system delay based on a comparison of the composite sum and the system delay threshold.

26. The mobile communication device of claim 25, wherein said first expected feedback signal patterns are attributed a first weight, and wherein said second expected feedback signal patterns are attributed a second weight, and wherein the composite sum comprises a weighted sum of the first sum based on the first weight and the second sum based on the second weight.

* * * * *